Nov. 11, 1941.     W. F. HELMOND     2,262,676
TYPEWRITING MACHINE
Filed Aug. 26, 1938     7 Sheets-Sheet 1

INVENTOR
WILLIAM F. HELMOND
BY
ATTORNEY

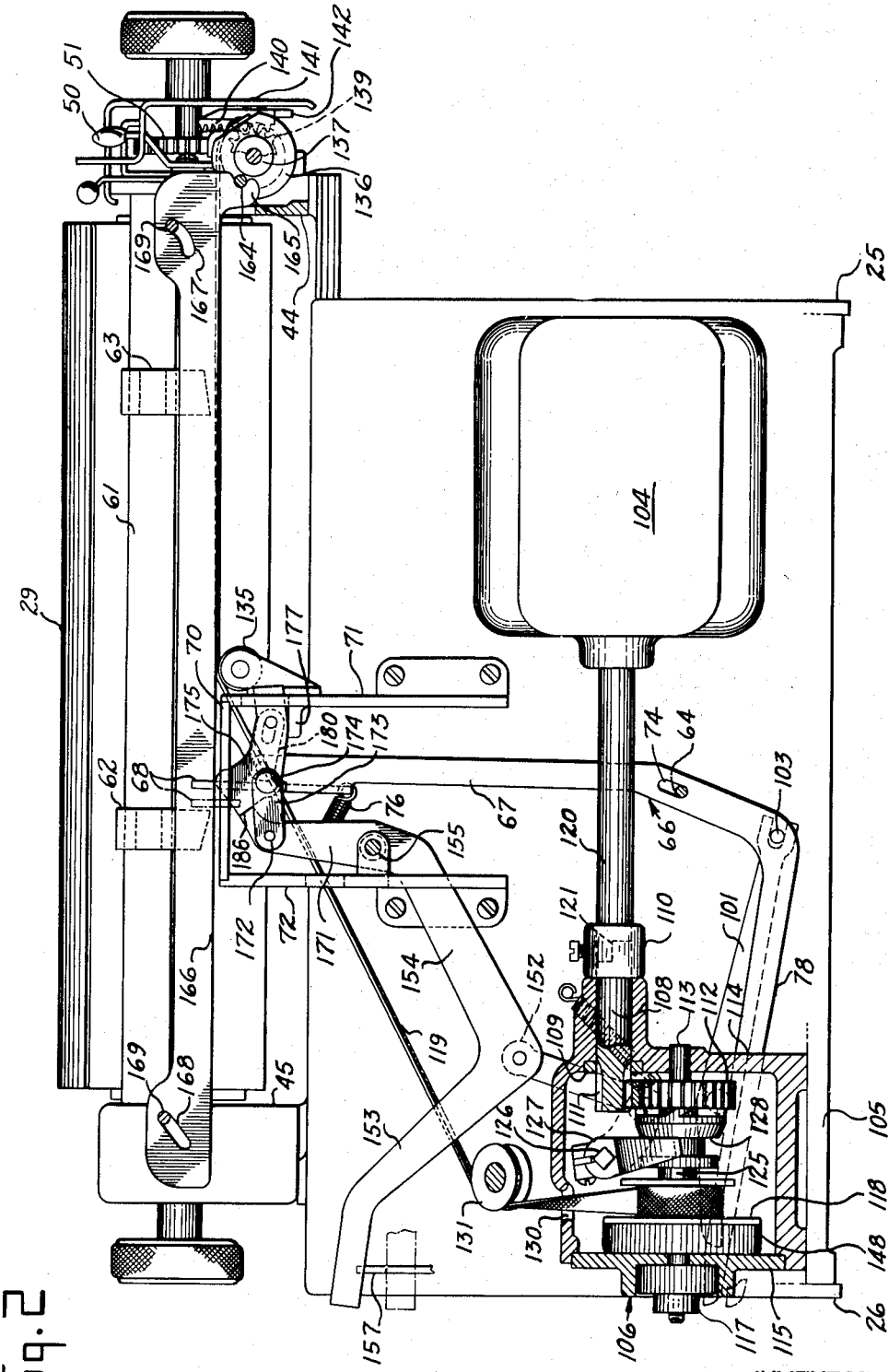

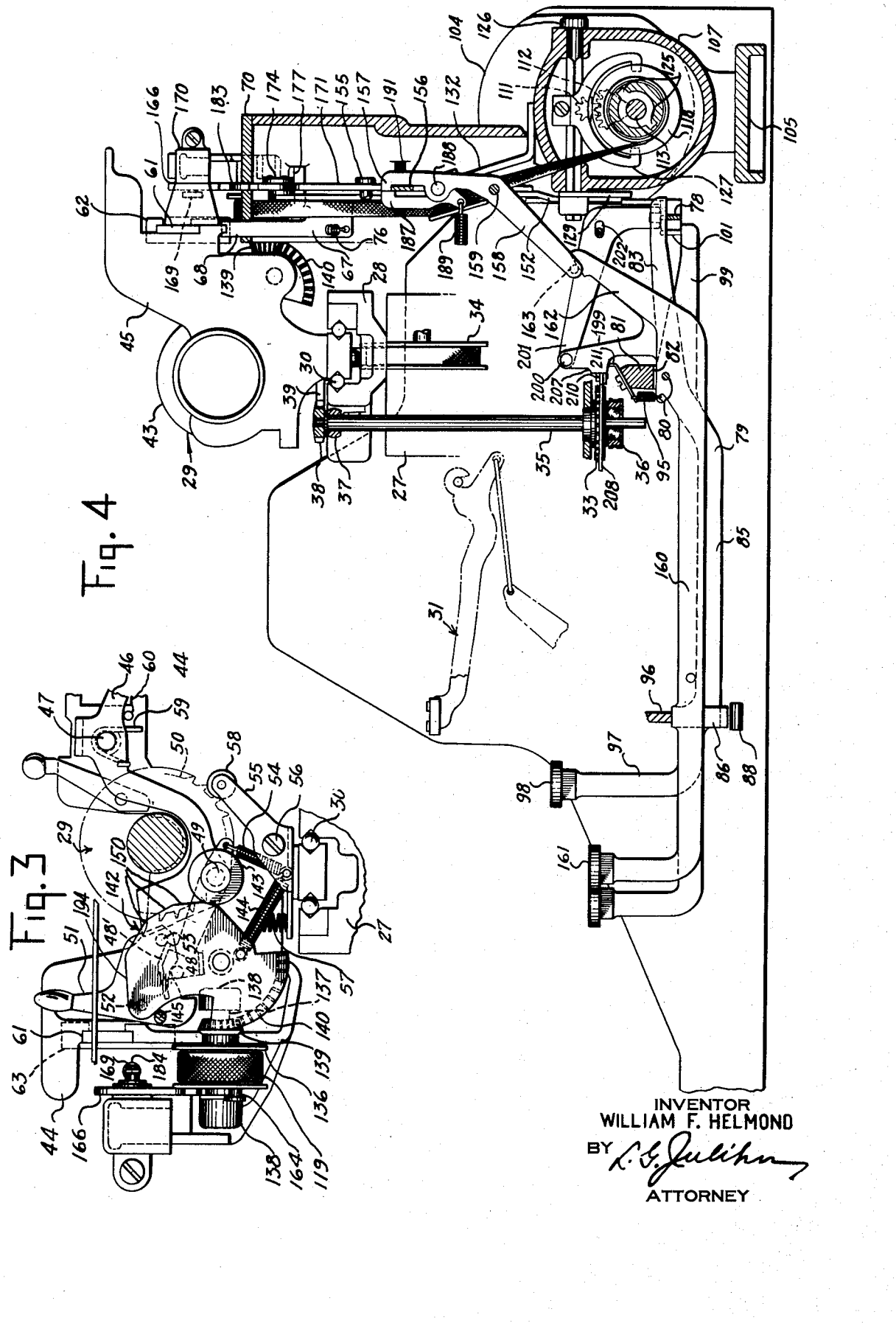

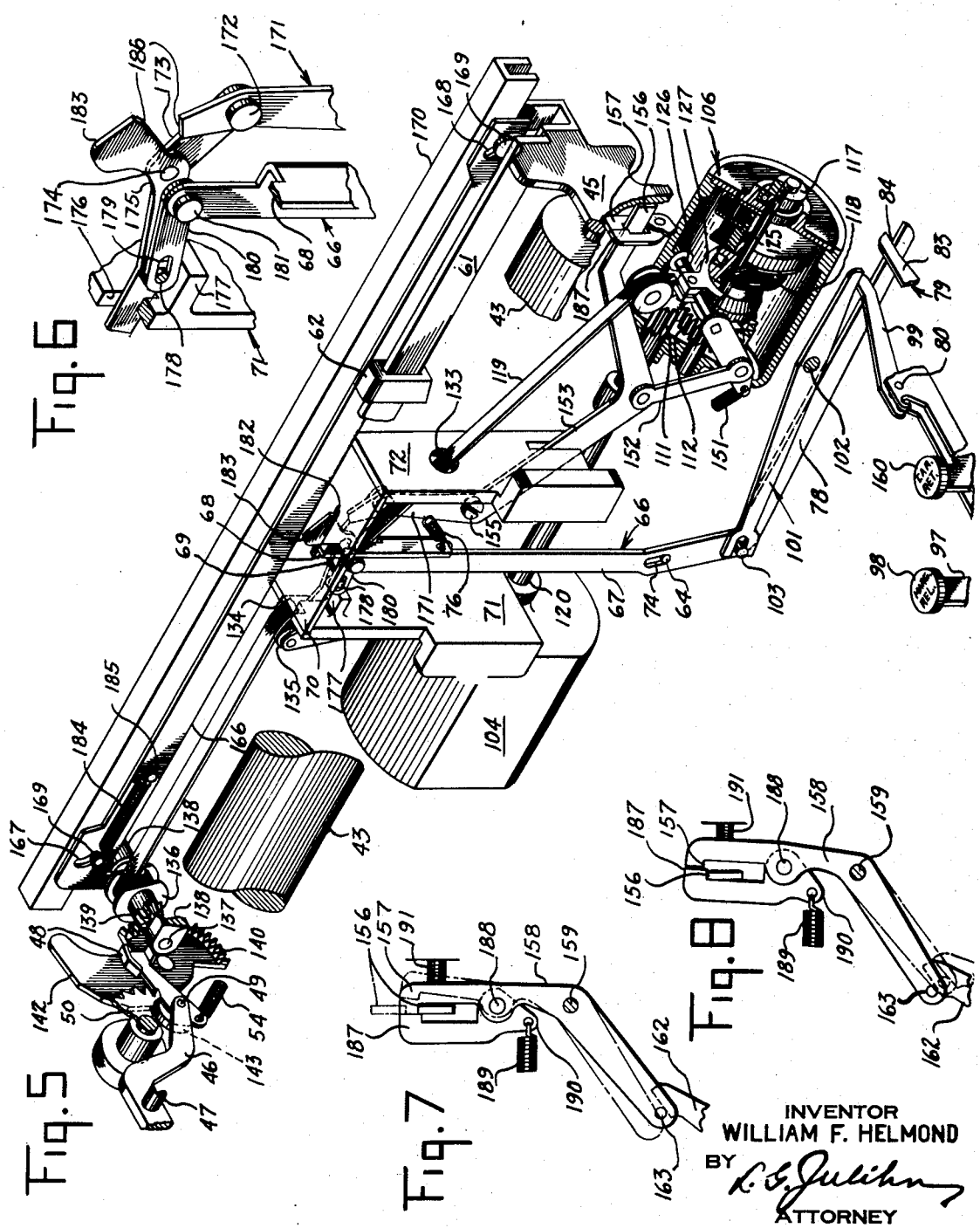

Nov. 11, 1941.     W. F. HELMOND     2,262,676
TYPEWRITING MACHINE
Filed Aug. 26, 1938      7 Sheets-Sheet 5
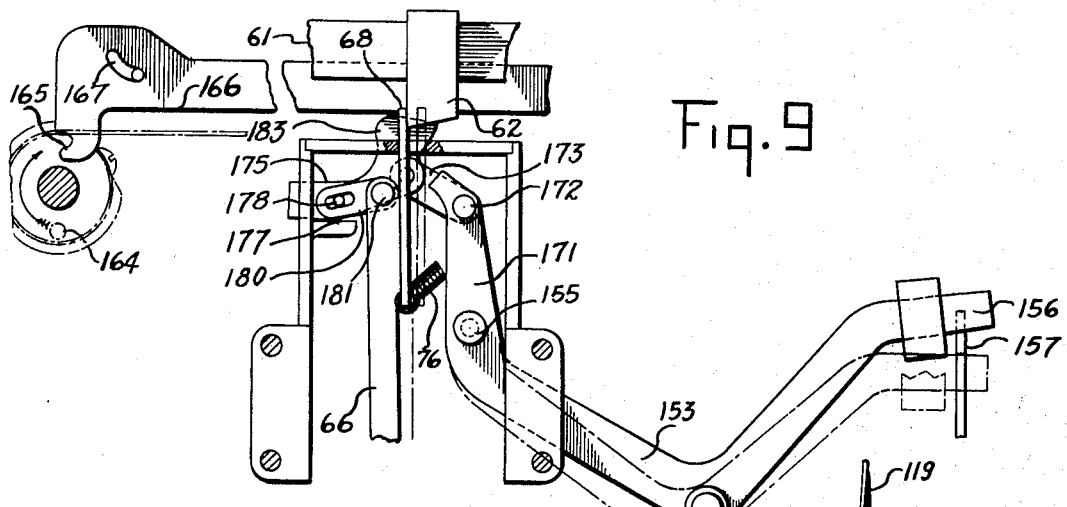
Fig. 9
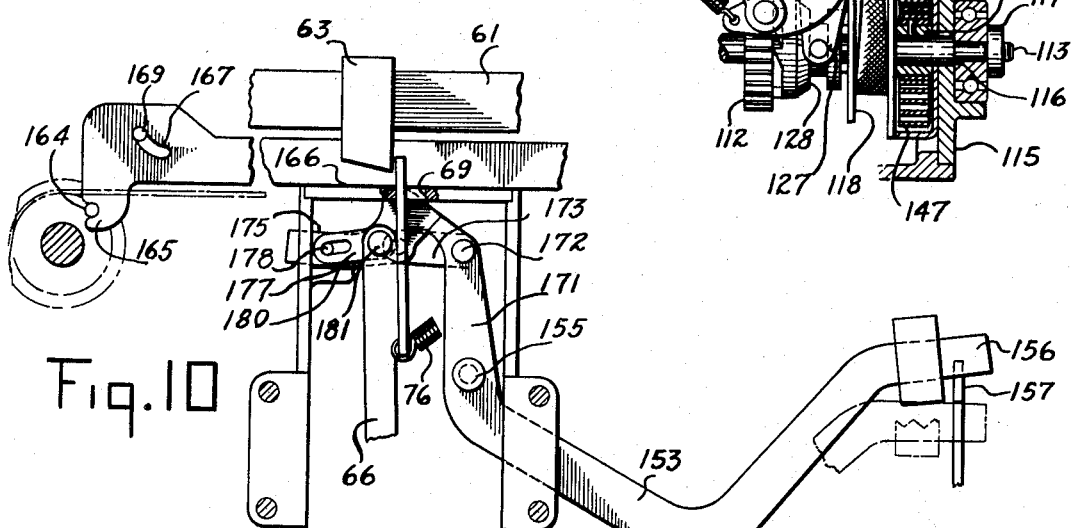
Fig. 10
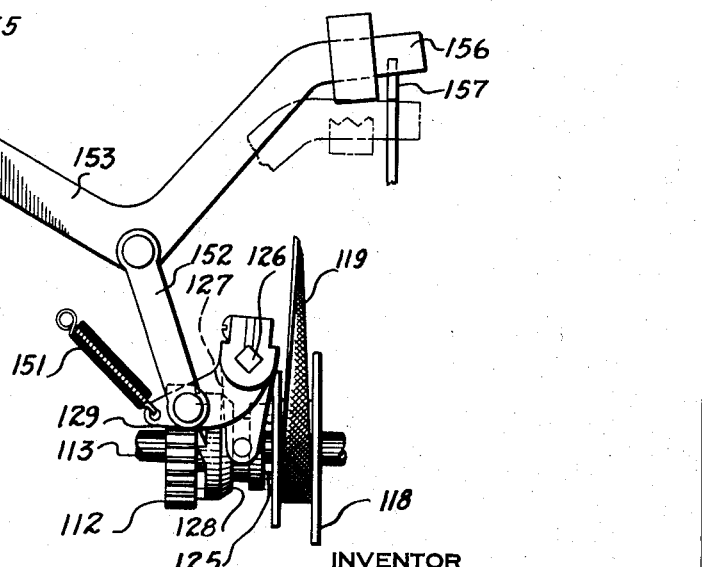
INVENTOR
WILLIAM F. HELMOND
BY
L. G. Julihn
ATTORNEY Nov. 11, 1941.  W. F. HELMOND  2,262,676
TYPEWRITING MACHINE
Filed Aug. 26, 1938  7 Sheets-Sheet 6
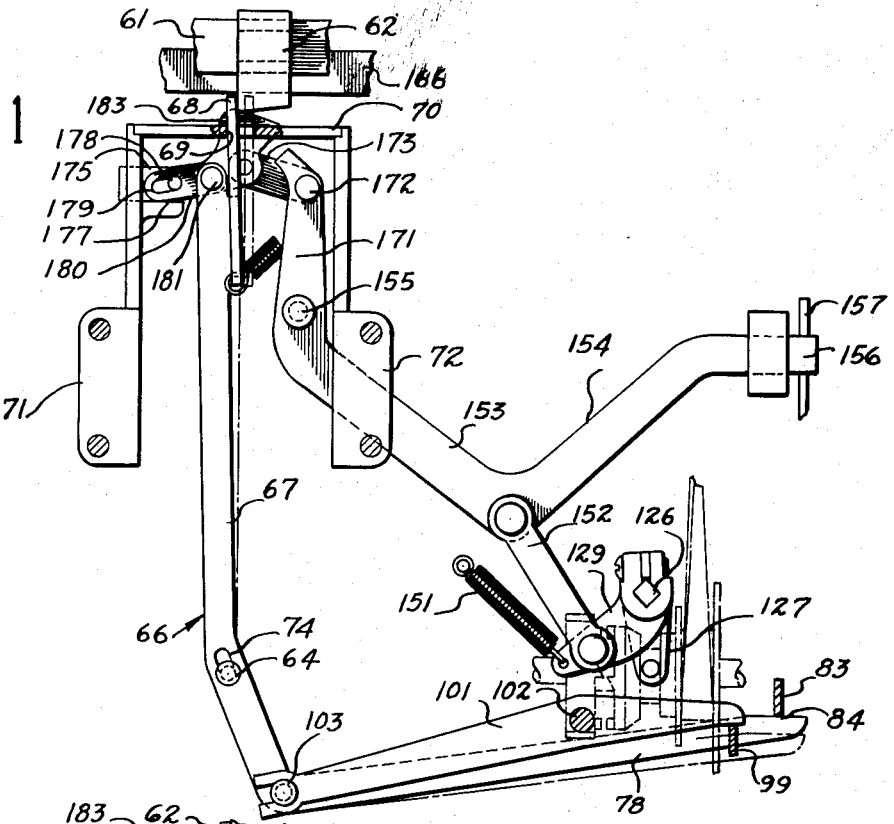
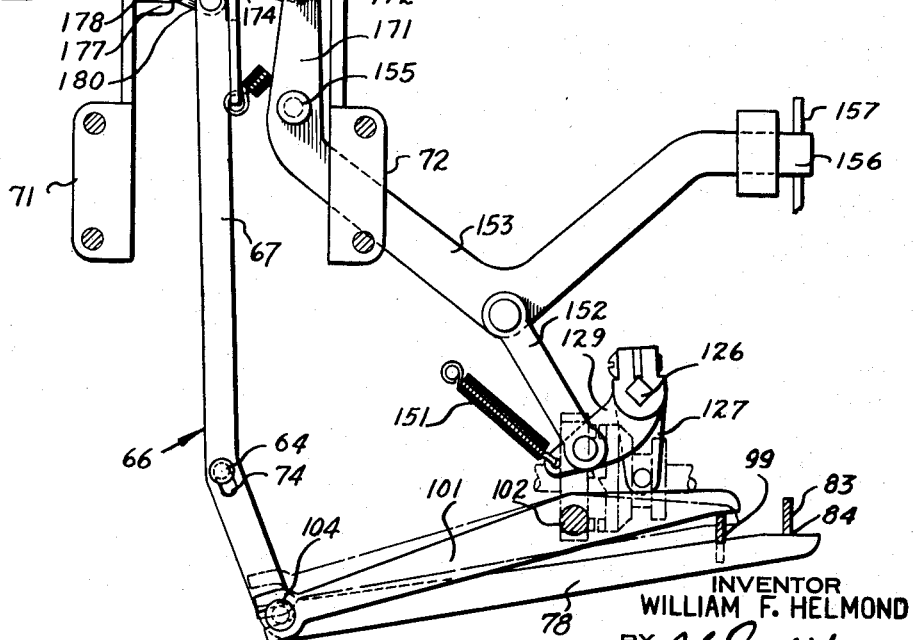
INVENTOR
WILLIAM F. HELMOND
ATTORNEY Nov. 11, 1941.  W. F. HELMOND  2,262,676
TYPEWRITING MACHINE
Filed Aug. 26, 1938   7 Sheets-Sheet 7
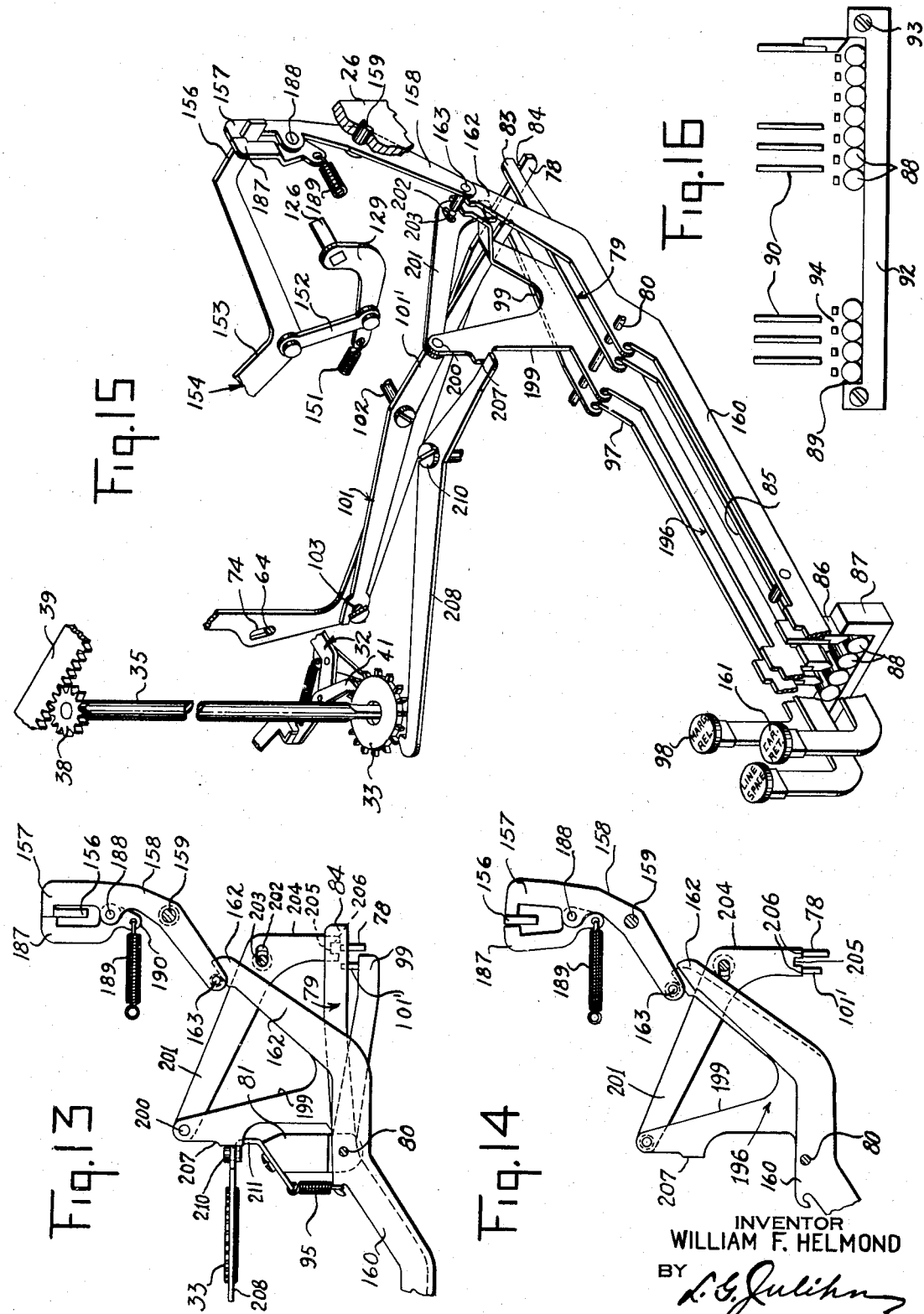
INVENTOR
WILLIAM F. HELMOND
BY
*L. G. Julihn*
ATTORNEY Patented Nov. 11, 1941

2,262,676

UNITED STATES PATENT OFFICE 2,262,676

TYPEWRITING MACHINE

William F. Helmond, West Hartford, Conn., assignor to Underwood Elliott Fisher Company, New York, N. Y., a corporation of Delaware Application August 26, 1938, Serial No. 226,947

22 Claims. (Cl. 197—66)

This invention relates to mechanism, in a typewriter or the like, for returning the carriage and operating the line space mechanism by power, and is herein explained by way of illustration with reference to a carriage mounting a revoluble platen and line spacing mechanism.

The invention employs a part which is caused to be displaced from a normal position, as through operation of a key or other suitable control, to cause a motor to operate carriage return and line space mechanisms. Conversely, restoration of said part to normal position terminates the motor operation of said mechanisms.

In former machines, upon operation of said key, the motor first moves a line spacer relatively to the carriage to effect a line spacing operation, the carriage itself limiting such relative movement of the line spacer so that further motor driven movement of said line spacer drives the carriage in return direction to a carriage return limiting stop. The end part of the motor-impelled carriage return movement to the stop restores said first named part to normal position to terminate the motor operation. If the line spacer failed to move relatively to the carriage, the latter would merely be returned and line spacing would fail to be effected. In said former machines, a letter-feed escapement device was adapted to permit the carriage to drop back and settle in final return position at a distance of one to two letter spaces from the carriage return limiting stop. This carriage drop back permitted the aforesaid part to be displaced again, as by re-operating the carriage return key, for effecting a line space operation at the time the carriage was settled in its final returned position. Upon such re-operation of such key, the resulting slight carriage return movement commensurate with said drop-back movement and following the operation of the line space actuator effected the restoration of said part again to terminate the motor operation, whereupon the carriage dropped back again and settled at a distance of from one to two letter spaces from the return stop.

Certain other machines employ a letter-feed escapement mechanism which permits very little or practically no drop back of the carriage from the carriage return limiting stop or margin gauge, the carriage drop back in such machines being only 1/64 of an inch or less. This latter slight carriage drop back and commensurate limited capability of carriage return movement are not sufficient for permitting start of the motor operation and effecting termination thereof by means of said first mentioned part.

On object of the present invention is to provide a mechanism which permits starting and stopping of the motor driven operation, particularly for line spacing at the time the carriage is in fully returned position, independently of any drop-back movement or advance of the carriage from the carriage return limiting stop.

Another object of the invention, relative to returning the carriage for a substantial extent and at the same time effecting a line space operation, is to have the stoppage of the motor operation depend not only on return of the carriage to the return stop but also to have said stoppage depend on full execution of the line spacing operation so that, substantially, the latter cannot fail to take place when the carriage is returned.

Another object of the invention is to provide for line spacing by power at will without returning the carriage, should the latter be in advanced position, away from the carriage return limiting stop. A feature of the invention resides in effecting such line spacing, without carriage return, by means of much of the same mechanism that otherwise both line spaces and returns the carriage. To this end the invention provides improved means operable at will, as by means of a special line space key disposed preferably at the machine's keyboard, to suppress the carriage return function of said mechanism and at the same time to make only the line spacing function of said mechanism active.

Another object of the invention is to simplify the construction and application of its embodiment in existing machines by utilizing existing parts, that are primarily designed for other purposes, to also serve as parts of the carriage return and line space mechanism. For example, in an existing machine, a member is operable at the end of a line to lock the type keys and in the present invention such member is adapted to cooperate also in the starting and stopping of the motor driven carriage return and line spacing operation.

For making the stoppage of the motor driven operation dependent on both the return of the carriage to the stop and on the operation of the line spacing mechanism, a novel device in the form of a toggle is provided and has one link connected with the aforesaid part that is displaceable from a normal position to start the motor driven operation and is restorable to said position to stop said motor driven operation. The other link of said toggle is adapted to react against the returning carriage. The arrangement may be such that said toggle is in flexed condition and is displaced bodily at the displacement of said part to start the motor drive. Means are provided whereby the line spacing operation straightens said toggle and keeps it straight so that it may react against the carriage return movement to restore said part to its normal position to stop the motor operation.

Other features and advantages will hereinafter appear.

In the drawings:

Figure 2 is similar to Figure 1 but shows parts as operated by the motor to line space.

Figure 3 is a left end view of the carriage illustrating details of the line space mechanism.

Figure 4 is a sectional side elevation of the machine showing disposition of the mechanism.

Figure 5 is a perspective of the carriage return and line space mechanisms.

Figure 6 is a perspective showing on an enlarged scale details of the toggle device employed in starting and stopping the motor operation.

Figures 7 and 8 are respectively normal and operated views of a latch device employed in starting and stopping the motor operation.

Figure 9 is a front elevation showing the condition of the mechanism immediately following operation of a carriage return key at the end of a writing line.

Figure 1:
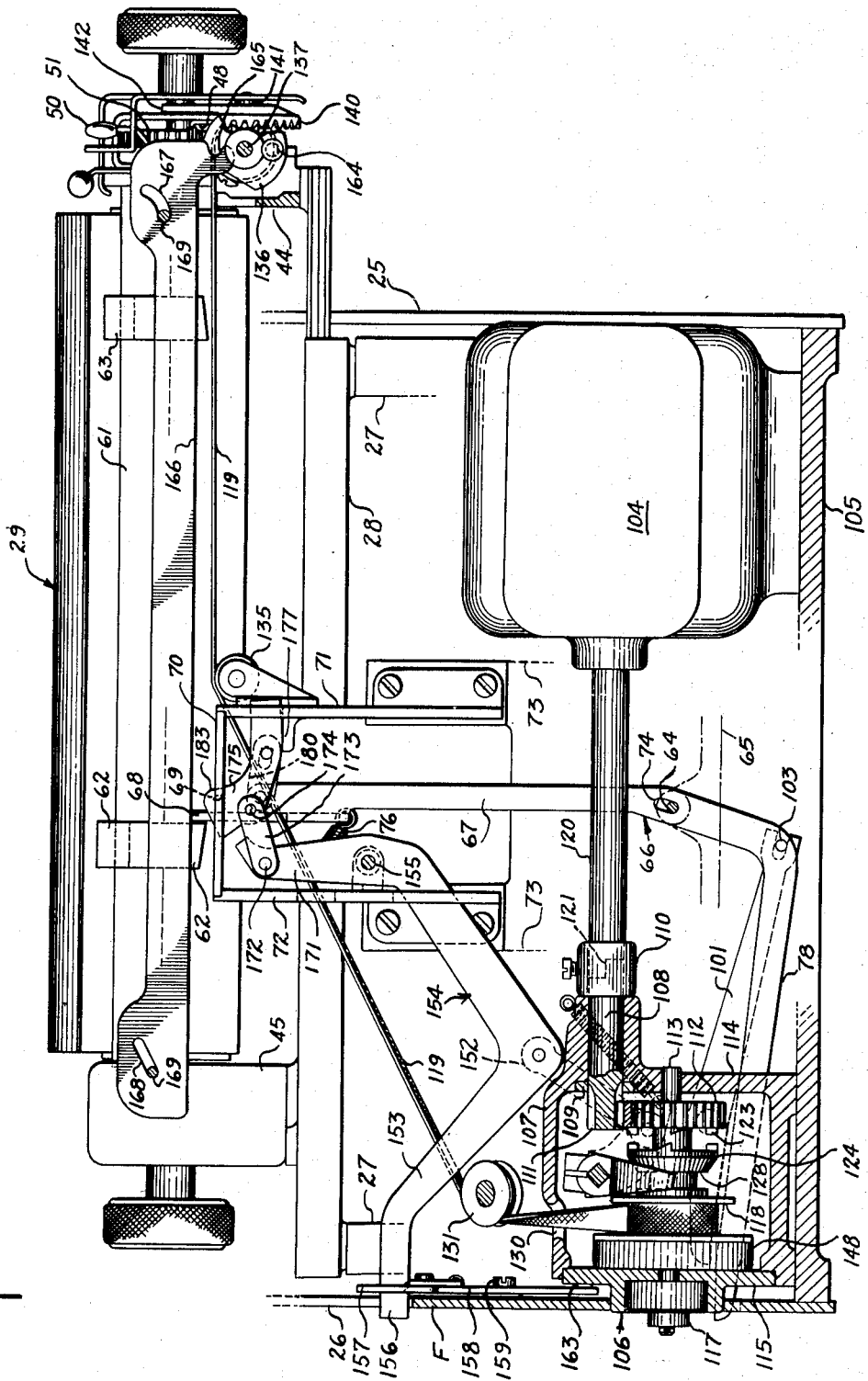
Figure 1 is a rear elevation of the carriage return and line space mechanisms embodying the invention and showing the disposition thereof relative to a typewriter and its carriage, some parts being shown in section to illustrate details.

Fgure 10 is a front elevation similar to Figure 9 but showing the mechanism at the stage when the line spacing has been effected and the motor operation is about to be stopped as the carriage reaches the end of its return.

Figure 11 is a front elevation showing a member of the mechanism actuated by a margin stop at the end of a writing line to lock the keys, the mechanism otherwise being in normal condition pending operation of a carriage return key or control.

Figure 12 is a front elevation showing the parts as conditioned by operation of a margin release key mechanism to permit advance of the carriage beyond the position represented in Figure 11.

Figure 13 is a fragmentary side view showing details of devices controlled by a carriage return key and a line space key.

Figure 14 is a fragmentary side view showing the devices as affected by operation of the line space key.

Figure 15 is a perspective of the carriage return key and line space key mechanisms and parts controlled thereby.

Figure 16 is a diagram of key-locking mechanism.

The machine's framework F supports the working parts and includes left and right side plates 25, 26 and suitable cross members. Parts of the framework and of the working mechanism not necessary to an understanding of the invention are omitted in the drawings.

The framework includes a mounting 27, Figure 4, for a carriage track 28 along which the typing carriage 29 travel on anti-friction rollers 30.

At operations of type actions 31, Figure 4, or a space key, not shown, an escapement dog device 32, Figure 15, is actuated relatively to an escapement wheel 33 so that the carriage, urged by a spring motor 34, advances in letter-feed steps. The escapement wheel 33 is fixed to a vertical shaft 35 having a lower bearing 36 in the framework and an upper bearing 37 in the carriage track member 28. A pinion 38 fixed to said shaft 35 meshes with a rack 39 on the carriage. A pawl 41 of the escapement dog device 32 normally engages the escapement wheel 33 to hold the latter and the carriage stationary, and said pawl is adapted to permit the escapement wheel to rotate clockwise of Figure 15 and thereby permit the carriage to move freely in return direction. The escapement dog device is similar to that shown in United States patent to Helmond No. 2,074,333.

A platen 43 is revolubly mounted in left and right end brackets 44, 45 of the typing carriage. A line space lever 46 has a fulcrum 47 in the left end carriage bracket 44 and is operable in uniform strokes, counterclockwise of Figure 3, so that a pawl 48 pivoted to said lever at 49 engages and drives a toothed line space wheel 50 coupled to the platen, the latter being thus rotated one, two or three line spaces depending on the setting of a line space pawl controller 51. Said controller is swingable about a pivot 52 in the left end carriage bracket 44 for setting it to different stations in which a pin 53 projecting laterally from the controller engages a cam edge 48' of the pawl and thus differently controls the time of engagement of the pawl with the line space wheel during the stroke of the line space lever 46. A spring 54 urges the pawl 48 into engagement with the controller pin 53 so that the latter guides the pawl to and from the line space wheel upon operation of the line space lever 46. A line-space detent lever 55 is pivoted to the left end carriage bracket 44 at 56 and is pressed by a spring 57 so that a detent roll 58 settles between two of the teeth of the line space wheel 50 to detent the platen, as at Figure 3. It will be obvious that during line spacing the detent spring 57 yields to permit the line space wheel teeth to override the detent roll 58. Following its line space stroke, the line space lever 46 is returned by a spring 59 to its normal position against a suitable stop 60 and the pawl 48 is concomitantly returned to normal position, Figure 3.

The carriage end brackets 44, 45 mount a cross rack 61 along which are locatable margin stops 62, 63 defining respectively the limits of carriage advance and carriage return movement.

Pivoted as at 64, Figure 1, to a part 65 of the framework is a lever 66 having an upright arm 67 whose upper end 68 is disposed in the path of the margin stops 62, 63, said end projecting through an opening 69 in a horizontal plate 70 supported by brackets 71, 72 secured to a part 73, Figure 1, of the framework. A slot 74 in the lever 66 permits the latter to be moved bodily downwardly to retract its upper end 68 from the path of the margin stops 62, 63 for effecting margin release as will be explained later, said end normally serving as a counter-stop for said margin stops on the carriage. A spring 76, anchored to the bracket 72, pulls upwardly and rightwardly, Figure 5, on the lever arm 67 to keep the lever normally so that its upper end is in the path of the margin stops and abuts the right side of the opening 69 in the plate 70. Normally the lever 66 has the bottom end of its slot 74 in abutment with the pivot 64 as in Figure 1.

At the advance of the carriage, its advance-limiting-margin stop 62 finally encounters the counter-stop end 68 of the lever 66 and thereby rocks the latter counterclockwise, Figure 11, from the dotted line position to the full line position, the upper end 68 of said lever then stopping against the left side of the opening 69 in the horizontal plate 70 and thus stopping the advance (leftward) of the carriage. In the Figure 11 displaced or full line position of the lever 66, a horizontal arm 78 of the latter has rocked a lever 79 to thereby lock the type keys.

The lever 79 is fulcrumed on a rod 80 associated with a framework cross bar 81 having a lever-retaining slot 82. A rear arm 83 of said lever overlies the arm 78 of the lever 66 at 84, Figure 15; and a forward arm 85 of said lever has an element 86 that, when said lever 79 is rocked as aforesaid, is moved down between an abutment 87 and an end of a series of blocks 88 thereby closing up said block series against an opposite abutment 89. The closed series of blocks 88 opposes depression of any of the type key elements represented at 90, Figure 16, to lock the type keys and, conversely, when the series of blocks is not closed any type key element 90 is free to enter between the corresponding two blocks 88. Said blocks 88 are caged in a suitable channel formed in a rack 92 attached to the framework as by screws 93, said rack also including the abutments 87, 89. The upper side of the channel is slotted as at 94 to admit the type key elements and the key-locking element 86. A spring 95 yieldably holds the lever 79 in its normal position against a stop 96, Figure 4.

A margin-release-key lever 97 is fulcrumed on the rod 80 and when its key 98 is depressed its rear arm 99 rocks a lever 101 counterclockwise from the broken-line position to the full-line position, Figure 12. Said lever 101 has a fulcrum 102 in a suitable part of the framework and has a pin-and-slot connection 103 to the lever 66. Thus, when said lever 101 is rocked to the full line position, Figure 12, by depressing the margin release key 98, the lever 66 is moved bodily downward to withdraw its upper end 68 from the path of the margin stops 62, 63. Figure 12 shows said upper end thus withdrawn from the margin stop 62 that limits the carriage advance. Upon such withdrawal, the rightward pull of the spring 76 acts to turn the lever 66 clockwise about the pivot 64 thereby bringing the upper end 68 back against the right side of the opening 69 of the plate 70 and under said margin stop 62 as indicated by the dot-and-dash outline of said end, Figure 12.

Power operation and control thereof for returning the carriage, and line spacing, will now be described.

An electric motor 104 is disposed at the back and near the left side of the machine on a cross bar 105 of the framework, Figures 1 and 4. A transmission and clutch unit 106 is disposed at the back and near the right side of the machine and includes a casing 107 also mounted on said cross bar 105. A short shaft 108 is journaled in the casing and is retained endwise therein by collars 109 and 110, secured to said shaft and bearing against the casing wall. Said shaft 108 has at its inner end a pinion 111 meshing with a larger gear 112 fixed on a spindle 113 journaled at its opposite ends in one wall 114 of the casing 107 and in a removable opposite casing wall 115. The spindle 113 is reduced in diameter to provide a spindle shoulder 116 that cooperates with an antifriction bearing, in the wall 115, and a collar 117, Figures 5 and 9, to retain said spindle and its gear 112 against end play. A flanged pulley 118 is normally rotatably loose on the spindle 113, and a draw band or tape 119 is attached to said pulley so as to be wound up on the latter when the pulley is rotated counter-clockwise of Figure 5. The pinion shaft 108 is coupled to and thereby driven by a motor shaft 120 as at 121.

During use of the machine the motor rotates and thereby rotates the gear 112 and spindle 113 continuously but normally without rotating the pulley 118. Said gear has clutch teeth 123 and the pulley 118 has splined thereto a toothed clutch collar 124 which is movable along the spindle from the open clutch position, Figure 1, to the position, Figure 2, in which it is clutched with said gear 112. The spline connection between the clutch collar 124 and pulley 118 is represented at 125, Figures 2, 4 and 5, and may be formed by one or more splines extending laterally from the clutch collar 125 into spline grooves formed in the bore of the pulley 118. Thus, in open clutch position of said clutch collar 124, the latter is rotatably loose on the spindle 113 with the pulley 118. A rock shaft 126 journaled in the casing 107 has fixed thereto a yoke 127 engaging the sides of a groove 128 in the clutch collar 124. An operating arm 129 fixed to said shaft 126, outside of the casing 106, serves to rock said shaft 126 and its yoke 127 to move said clutch collar 124 to close and open the clutch.

The draw band 119 passes through a casing opening 130, Figure 1, and then over a guide pulley 131 mounted on a bracket 132, Figure 4, supported by the framework. The draw band 119 passes through openings 133, 134 in the brackets 72, 71 and over a guide pulley 135 on the bracket 71 and thence to a pulley 136 fixed to a line-space actuating shaft 137 journaled in lugs 138 of the left end carriage bracket 44. The draw band 119 is attached at its end to said pulley 136 and is normally wound therearound so that rightward pull on the draw band rotates said pulley 136 and its shaft 137 clockwise, Figure 5. A bevel pinion 139 is fixed to said shaft 137 and meshes with a beveled gear sector 140 rotatable about a bearing 141 at the carriage end bracket 44. Said sector 140 is integral with a cam 142 adapted to actuate the line-space lever 46 upon clockwise rotation, Figure 3, of said sector 140 effected by means of the pinion 139, shaft 137 and pulley 136 through rightward pull upon the draw band 119, said line-space lever 46 having a cam follower roll 143. A spring 144 yieldably keeps the parts in normal position determined by abutment of the cam sector 142 with a stop 145 in the left end carriage bracket 44, and also serves to restore the parts following a line space operation.

The draw band actuating pulley 118 in the drive casing 106 has a hub 146, Figures 5 and 9, to which is attached the inner end of a spiral take-up spring 147 anchored at its outer end to a drum 148 fixed, against rotation, to the casing at 149. Said spring 147 acts to rotate the pulley 118 to wind up the draw band thereon and keep it taut should the carriage be returned manually, that is, without rotating the pulley 118 by power. Said take-up spring 147 is wound up as the pulley 118 rotates in the direction to unwind the draw band therefrom as during movement of the carriage in advance or letter-feeding direction. In no case, however, is the tension of the take-up spring 147 sufficient to overcome the spring 144 that keeps and restores the line spacer sectors 140, 142 to normal position.

The rise of the cam sector 142 may be in the form of three steps 150, Figure 3, one step for each of the three units of line space movement effected by a stroke of the cam-sector-following line space lever 46. Each step 150 may be shaped so that a comparatively large initial part of a step of angular movement of the sector 142 is used in effecting a comparatively small initial part of the unit step of the line space wheel 50. Thus, rotation of the cam sector 142 is made to easily overcome the resistance of the detent roll 58 and its spring pressed lever 55 to the unit step of rotation of the toothed line space wheel 50 since, as will be obvious, said resistance is mainly at the beginning of a step of the line space wheel and decreases as the line space wheel tooth nears its dead center position relatively to the detent roll 58. It will further be obvious that as the tooth of the line space wheel passes said dead center position, the rotation of the line space wheel for the remainder of the step will be aided by the spring pressed detent lever 55 and that, correspondingly, the last small part of the step of the cam sector 142 will be taken with comparatively little resistance.

A spring 151 anchored to the framework and acting on the clutch operating arm 129 tends to rock the shaft 126 to close the clutch. A link 152 connects said arm 129 to an arm 153 of a lever 154 fulcrumed at a pivot-lug 155, Figures 1 and 11, of the bracket 72. An extension 156 of said lever 154 is normally engaged by a latch hook 157 of a latch lever 158 pivoted at 159 to the framework side plate 26, Figures 1 and 15. With said lever extension 156 thus latched, the spring 151 is normally restrained from closing the clutch.

A carriage return key lever 160 is fulcrumed on the rod 80 and by depression of its key 161 is rocked so that a rear arm 162 thereof engaging a stud 163 in the latch lever 158 rocks the latter clockwise of Figure 15 to the dotted line position, Figure 7, to release the lever 154 and thus cause the spring 151 to close the clutch and concomitantly rock said lever 154 to the full line position, Figure 9.

The motor driven rotation of the pulley 118, resulting from closing the clutch, winds the draw band 119 around said pulley 118 and concomitantly unwinds said draw band from the carriage carried pulley 136 thereby rotating the latter together with its shaft 137 and beveled pinion 139 clockwise of Figure 5; and the beveled gear sector and associate cam 142 are concomitantly rotated counterclockwise of Figure 5 so that said cam 142 imparts a full line space stroke to the line space lever 46.

The pulley 136 has a rear pin 164 that normally is disposed in its orbit below a hook 165, Figure 9, on the left end of a motor-shut-off-control bar 166. At the line space effecting rotation of said pulley 136, said pin 164 reaches said hook 165 and thereupon moves said bar downwardly and to the right from the Figure 9 position to the Figure 10 position. Said bar 166 has two diagonal slots 167, 168 adapted to guide it, for such movement, upon supporting studs 169 provided on the front of a transverse rack 170 mounted on the carriage 29.

Referring back now to the lever 154, Figure 1, an upright arm 171 thereof is pivoted at 172 to a transverse link 173 that in turn is pivoted at 174 to another link 175, said links forming a toggle. The end part of the link 175, away from the pivot 174, may pass through a guide slot 176 and may also rest upon a shelf 177 of said bracket 71, Figure 6. The link 175 has a stud 178 passing into a slot 179 of a link 180 pivoted at 181 to the lever 66 that presents the counter-stop end 68 for the margin stops 62, 63. The link 180 thus connects the toggle 173, 175 with the counter-stop lever 66 and also leaves the latter free to be moved downwardly as in Figure 12 to effect margin release without affecting said toggle.

With the carriage 29 at the line-end position, the carriage advance limiting margin stop 62 has displaced the counter-stop end 68 of the lever 66 to the full line position, Figure 9, and the link 180 has been correspondingly displaced leftward. If now the carriage return key lever 160 is operated, the resulting closing of the clutch 123, 124 and rocking of the lever 154 to the full line position, Figure 9, is accompanied by movement of the toggle links 173, 175 to the Figure 9 position in which the stud 178 is midway of the link slot 179, and in which position the toggle is flexed as shown. The hereinbefore explained linespace operation resulting from the closing of the clutch has displaced the motor-shut-off-control bar 166 downwardly from the Figure 9 position to the Figure 10 position. Rotation of the drawband operated line space shaft 137 and downward movement of said bar 166 are stopped by abutment of the tops of the slots 167, 168 of the bar 166 with the studs 169 as in Figure 2. At the downward movement of the bar 166, its lower edge depresses a nose 183 on the toggle link 175 and thereby straightens or extends the toggle 173, 175 into the Figure 10 position, the lever 154, however, remaining in its tripped position so that the clutch remains closed, since the straightening of the toggle merely moves the stud 178 against the left end of the slot 179 of the previously leftwardly displaced link 180. Said nose 183 projects up through the plate 70 through an opening 182, Figure 5.

With the rotation of the line space shaft 137 by the draw band 119 limited as aforesaid, it will be obvious that the continued pull of the draw band by the motor now returns the carriage. During the carriage return, the shaft 137 and pin 164 are kept in their operated positions, Figure 10, by the draw band pull and therefore the bar 166 is kept down, thereby keeping the toggle links 173, 175 straightened to keep the counter-stop end 68 of the lever to the left, as in Figure 9, even though the margin stop 62 recedes from said counter-stop 68 during the carriage return run. The clutch closing spring 151 is strong enough to oppose rightward return of said counter-stop 68 by the spring 76.

It will be obvious now that when the carriage return limiting margin stop 63 of the power driven returning carriage reaches said counter-stop 68, it will move the latter rightwardly and thereby through the straightened or extended toggle 173, 175 restore the lever 154 so that the latter is caught by the latch hook 157 again, provided the carriage return key lever 160 has been released and returned, by its spring 95, as is usual. Such restoration of said lever 154 concomitantly opens the clutch and the resultant cessation of pull on the draw band 119 permits the line spacing shaft 137 to be restored to its Figure 9 position by the pull of the line space gear sector spring 144, Figure 3. At the same time, the motor shut-off control bar 166 is restored to its normal position, Figures 1 and 9, by a spring 184, Figure 5, anchored at one end to the left stud 169 and attached to the bar 166 at 185.

The toggle link 175 and the arm 171 may have stop edges 186, Figure 6, which come together as at Figure 2 to limit the straightening of the toggle so that it cannot be thrown below its dead center position.

The carriage may also be power returned, with concomitant power operation of the line space mechanism, from any position in which the carriage advance limiting margin stop 62 has not yet reached the counter-stop 68. In that case, at operation of the carriage-return key lever 160, the resulting release and movement of the lever 154 to the Figure 9 full line position flexes the toggle 173, 175 without moving the counter-stop 68 from its normal position (represented by the dotted outline in Figure 9). The toggle is thus flexed inasmuch as the link pin 178 is stopped against the left end of the unmoved counter-stop link 180. At the resulting motor driven line space operation and concomitant depression of the bar 166, the nose 183 of the toggle 173, 175 is depressed and said toggle straightened, and it is thereby that the counter-stop 68 is then moved leftward to the Figure 10 position, the clutch spring 151 being strong enough to keep the lever 154 in its tripped position and to keep the clutch closed as in Figure 10. With the counter-stop 68 thus moved leftward by operation of the line-space mechanism, its restoration rightward when engaged by the counter-stop 63 of the returning carriage operates through the straightened toggle 173, 175 to restore the lever 154 to the latch hook 157 and open the clutch 123, 124 to shut off the power operation and cause restoration of the parts at the end of the carriage return run as previously described.

To keep the lever 154 restored and the clutch open even though the carriage-return key lever 160 should be kept depressed and therefore keep the latch hook 157 withdrawn, a secondary latch hook 187 is provided to engage the lever extension 156 as in Figure 8. Said secondary latch hook 187 is slightly below and is normally pushed aside by the latch hook 157 as in Figure 7 so that normally it does not oppose upward movement of the lever extension 156 when the latch hook 157 is withdrawn. If, upon restoration of the lever 154 by the carriage, its extension 156 be caught and held by the secondary latch hook 187 as in Figure 8 due to keeping the carriage return key lever 160 depressed at the end of a carriage return, then subsequent restoration of said key lever 160 will permit restoration of the latch hook 157 by spring pressure so that said hook 157 pushes the secondary latch hook 187 aside again and takes over the latching of the lever extension 156. The secondary latch hook 187 may be pivoted at 188 to the lever 158 that presents the primary latch hook 157, and a spring 189 anchored to the side plate 26 may pull upon an arm 190 of said secondary latch hook so as to urge the primary latch hook lever 157, 158 into normal position for its restoration and also serve to urge the secondary latch hook into effective position. A secondary spring 191 may be applied, Figures 7 and 8, to aid the restoration of the latch lever 158 to normal position determined, Figure 7, by abutment of said lever 158 with the side of the extension 156.

The arm 153 and the link 152 connecting it to the clutch operating arm 129 constitute toggle links disposed so that the reaction of the strong cluch closing spring 151 on the latch hook 157 or 187 is light.

The carriage advancing spring motor 34 is resistant enough to stay the return of the carriage so that upon closing the clutch, the resultant pull of the draw band 119 works the line space mechanism and depresses the bar 166 before said pull starts a return movement of the carriage. However, the mechanism may also function so that operation of the line spacing mechanism may occur later. It may occur through arrest of the carriage return movement by means of the margin stop 63 and counter-stop 68. In that case, with the lever 154 still tripped and the clutch still closed as in Figure 9, the counter-stop 68 in arresting the carriage is in the dotted line position, Figure 9, and is forcibly kept in said position by the pull of the draw band on said carriage; and the toggle 173, 175 is thus in flexed position. Since under this condition, the draw band pull can return the carriage no farther, it alternatively acts to work the line space mechanism and concomitantly depress the control bar 166. Said control bar, thus depressed, works upon the nose 183 of the flexed toggle 173, 175 and straightens the latter, thereby restoring the lever 154 to latched condition and concomitantly opening the clutch 123, 124 to stop the motor operation, whereupon the spring 184 restores the bar 166, and the line space mechanism springs 54, 59 and 144 restore their respective parts.

It will be seen now that restoration of the lever 154 to open the clutch 123, 124 to shut off the motor operation depends on depression of the bar 166 and hence depends on a full operation of the line space mechanism, and it also depends on the carriage reaching its full return position as determined by the margin stop 63. In effect, the operation of the bar or controller 166 conditions the toggle for an operation by the counter-stop to restore the lever or part 154 to normal position. The movements from the bar 166 and the margin stop 63 are therefore complemental to effect the restoration of the part 154. Thus, operation of the line space mechanism is assured whenever the carriage return key 161 is depressed and the motor operation is thereby started Depending upon the type of letter feed escapement mechanism employed, the carriage, urged by its spring motor 34, may or may not have a drop-back movement following its arrest and the shut off of the motor operation. In either case, it is feasible to repeat the power operation of the line space mechanism at the end of the carriage return by repeating a depression of the carriage return key lever 160. If the carriage escapement mechanism is such that the carriage has no drop-back movement at the shut off of the motor operation and remains with its margin stop 63 against the counter-stop 68 so as to hold the latter against leftward movement, then the depression of the carriage return key lever 160 for line spacing nevertheless releases the lever 154 and concomitantly closes the clutch, and the toggle 173, 175 is correspondingly flexed. The resulting motor operation pulls the draw band 119 to work the line space mechanism and concomitantly depress the bar 166. Said bar 166 thus straightens the toggle 173, 175 again to restore the lever 154 to latched condition thereby opening the clutch and shutting off the motor operation. The depression of the bar 166 may be so timed that the clutch parts 123, 124 become disengaged at the end of the full line space stroke of the line space lever 46.

The extension 156 of the clutch controlling lever 154 may be provided with a weight 193 operative by its momentum when the lever 154 is being restored by depression of the bar 166 to supplement said lever 166 in restoring said lever slightly in excess so that it will be assuredly caught by either the primary latch 157 or by the secondary latch 187. The arrangement may also be such that the line space cam 142 has an excess end portion of stroke wherein a dwell portion 194 of said cam, Figure 3, passes the line space lever follower 143 idly, it being obvious that the point or instant of actual disengagement of the clutch members 123, 124 may occur during said excess portion of line space cam stroke.

A line space key lever 196, Figure 15, is operable for causing line spacing by power, without returning the carriage, from any position intermediate the end positions defined by the margin stops 62, 63. Said key lever 196, fulcrumed on the rod 80, is rocked at depression of its key 197 so that a rear arm 198 thereof, engaging the stud 163 of the latch lever 158, rocks the latter to withdraw the latch hook 157 from the extension 156 of the lever 154 for resultant closing of the clutch, like in Figure 9.

Said line space key lever 196 has an arm 199 connected at 200 to a link 201 having a slot 202 for slidably bearing upon a stud 203 in the framework side plate 26. Said link 201 has a pendent arm 204 having a slot 205, Figure 13, forming two stops 206 for the arms 78, 101', of the levers 66, 101. Normally the parts are positioned as in Figure 13 so that said stops 206 are clear of said arms. A nose 207 of the line space key lever 196 is for engaging a carriage return blocking lever 208 turnable about a vertical pivot 210 on a bracket 211, Figure 4, supported by the framework cross bar 81. Said lever 208 may block the carriage return movement in that it may be turned, by operating the line spacer key lever 196, so that its end 213 intercepts one of the teeth of the escapement wheel 33, it being remembered that said wheel is positively coupled to the carriage by means of the shaft 35, pinion 38 and rack 39 so that it turns at movement of the carriage in either direction.

With the carriage line space key lever 196 depressed, the stops 206 are over the arms 78, 101', Figure 14, so that the levers 66 and 101 are held to block movements thereof. The counter-stop 68 is thus kept in the dotted line position of Figure 9 at operation of the line space key lever 196. By said operation of the line space key lever 196, the escapement wheel 33 is also locked by mean of the lever 208 thereby blocking return movement of the carriage. The accompanying release of the lever 66 flexes the toggle 173, 175 and closes the clutch. At the resulting pull on the draw band 119, the line space mechanism is operated and the bar 166 is concomitantly depressed, thereby straightening the toggle 173, 175, which reacts against the held counter-stop 68, to restore the lever 154 to the latch 157 or 187 and reopen the clutch 123, 124 to stop the motor operation at the end of a line space operation.

The line space key lever 196 may have an element 214 to enter between the blocks 88 to lock the keys at the line space operation.

Each of the several levers 79, 97, 160, 196 has a restoring spring 95 and may return against the stop 96, Figure 4.

For locking the keys at operation of the carriage return key lever 160, a pin 214 of the latter engages and rocks the lever 79 so that its element 86 is interposed in the series of blocks 88.

The keys usually remain locked during the carriage return movement, even though the carriage return key lever 160 is released, because usually the bar 166 is depressed through occurrence of the line spacing operation as soon as the clutch 123, 124 is closed, and said bar remains depressed during the carriage return run. The bar 166 in its depressed position has straightened the toggle 173, 175 and thereby keeps the lever 66, 68 in the key locking position, Figure 10, until the clutch is opened at the end of the carriage return run.

What is claimed is:

1. In a typing machine, in combination, an advanceable carriage returnable to a predetermined position, a line spacer, power-means, an actuator for returning said carriage and operating said line spacer, means including a part displaceable from a normal position to effect operation of said actuator by said power-means, a toggle adapted to be flexed by the displacement of said part, an element operable to straighten the flexed toggle, an element operable, and effective through the straightened toggle, to restore said part to terminate the power operation of said actuator, means acting concomitantly with actuation of the line spacer to operate one of said elements, and means acting through the return of the carriage to said position to operate the other element.

2. In a typing machine, in combination, an advanceable carriage returnable to a predetermined position, a line spacer, power-means, an actuator for returning said carriage and operating said line spacer, means including a part displaceable from a normal position to effect operation of said actuator by said power means; and shut-off mechanism including an element operated by operation of said line spacer, an element operated by the return of said carriage to said position, and means operatively associated with said elements and said part, conditionable by the operation of one of said elements, to enable the operation of the other one of said elements to restore said part to normal position to terminate the power operation of said actuator.

3. In a typing machine, in combination, an advanceable carriage returnable to a predetermined position, a line spacer on said carriage and movable relatively thereto to effect a line spacing operation, said line spacer thereupon being movable along with said carriage in return direction, power-means, an actuator operable and acting through said line spacer for effecting line-spacing and return of said carriage, means including a part displaceable from a normal position to effect operation of said actuator by said power means; and shut-off mechanism, including an element operated by the relative movement of said line spacer to said carriage, another element operated by the return of said carriage to said position, and means operatively associated with said elements and said part, conditionable by the operation of either one of said elements, to enable the operation of the other one of said elements to restore said part to normal position to terminate the power operation of said actuator.

4. In a typing machine, in combination, a reciprocatory carriage, a line-spacer on said carriage limitedly actuatable to effect line spacing, power means, an actuator connected to said linespacer, for limitedly moving the latter relatively to the carriage and ensuingly returning said carriage to a predetermined position, means including a part displaceable from a normal position to cause operation of said actuator by said power means, a device operatively connected with said means that includes said part, including two elements movable from ineffective to effective positions to supplement each other to effect a restoration of said part to normal position, to thereby terminate the power operation of said actuator, means to effectively position one of said elements by the actuation of said line-spacer and means to effectively position the other of said elements by the return of the carriage to a predetermined return position, a line-space key operable to effect displacement of said part to cause a power operation of said actuator, and means to condition said other element in effective position by the operation of said line-space key, whereby said actuator in operating said linespacer is capable of restoring said part to normal position and whereby the operation of said power means is terminated without said actuator having returned the carriage.

5. The invention as set forth in claim 4, inclusive of means coacting with said line space key to block a return movement of said carriage.

6. In a typing machine, in combination, a reciprocatory carriage, a line spacer on and limitedly movable relatively to said carriage, powermeans, a power operable actuator for moving said line spacer and ensuingly returning said carriage to a predetermined position, means including a key operable to cause operation of said actuator by said power-means for operating said line spacer, a toothed wheel connected to said carriage to be rotated positively by the return movement of the carriage, and means rendered effective by means of said key to engage and block said toothed wheel to block the return movement of said carriage in order to effect a power operation of said line spacer only, means being provided to terminate automatically said power operation.

7. In combination, a reciprocatory typing machine carriage, power means, an actuator operable by said power means for operating said carriage, a normally open clutch closeable for connecting said actuator with said power means, a spring tending to close said clutch, a latch normally holding said clutch open, a key depressible to withdraw said latch for resultant closing of said clutch, means acting automatically consequently to the power operation of said carriage to reopen said clutch, and a normally ineffective secondary latch conditioned by the depression of said key to hold said clutch upon being reopened until said first-named latch is restored by the release of said key.

8. The combination with a frame, a typing carriage thereon, an operatable device on the carriage, and normally ineffective power-means for returning said carriage and operating said device, of starter means displaceable on said frame from normal to operated position to render said powermeans effective, a power-shut-off controller on said carriage shifted relatively to said carriage by the operation of the operatable device, a carriage-return limiting counter-stop on said frame movable from and back to normal position, means to move said counter-stop to normal position by the return of the carriage to a definite position, and an operative connection from said starter means to said controller and counter-stop, providing for movement of said counter-stop from normal position in response to the displacement of said starter means to operated position and having provision rendering it responsive to operations that are supplemental to each other, by the shift of said controller relatively to said carriage and the movement of said counter-stop to normal position by the returning carriage, to restore said starter means to normal position to render said power means ineffective.

9. The combination with a frame, a typing carriage thereon, an operatable device on the carriage, and normally ineffective power-means for returning said carriage and operating said device, of starter-means displaceable on said frame from normal to operated position to render said power-means effective, a power-shut-off controller on said carriage shifted relatively to said carriage by the operation of the operatable device, a carriage-return limiting counter-stop on said frame movable from and back to normal position, means to move said counter-stop to normal position by the return of the carriage to a definite position, an operative connection from said starter-means to said controller and counter-stop, providing for movement of said counter-stop from normal position in response to the displacement of said starter-means to operated position, and having provision for rendering it responsive to operations that are supplemental to each other, by the shift of said controller relatively to said carriage and the movement of said counter-stop to normal position by the returning carriage, to restore said starter-means to normal position to render said power means ineflective, and means operable at will to localize said counter-stop in normal position, independently of said carriage, whereby said starter-means may be restored by said power-means upon operating said device without returning said carriage from an advanced position.

10. The combination of a frame, a typing carriage thereon, a limitedly rotatable shaft journaled on said carriage, a power-operable connection to said shaft to rotate the latter limitedly and thereupon return said carriage, an element movably mounted on said carriage and having an edge extending along and movable transversely of the direction of carriage travel, an operative connection by which the limited rotation of said shaft moves said element, power mechanism actuatable for operating said first-named connection, and starter-means operable from a normal position to effectuate said power mechanism and having provision for rendering it restorable from an operated position partly under control of said movable element and partly under control of the movement of the carriage as the latter nears a predetermined return position.

11. The combination with a frame, a typing carriage thereon, a line spacer on the carriage, and normally ineffective power-means for returning said carriage and operating said line spacer, starter-means on said frame displaceable from normal to operated position to render said power-means effective, a power-shut-off controller on said carriage shifted relatively to said carriage by the operation of said line spacer, a carriage return limiting counter-stop on said frame movable from and to a normal position, means to move said counter-stop to normal position by the return of the carriage to a definite position, an operative connection from said starter-means to said controller and counter-stop, providing for movement of said counter-stop from normal position in response to the displacement of said starter-means to operated position and having provision rendering it responsive to operations that are supplemental to each other, by the shift of said controller relatively to the carriage and the movement of said counter-stop to normal position by the returning carriage, to restore said starter-means, a line-space key, a device responsive to operation of said key to displace said starter-means, another device responsive to said key operation to localize said counter-stop in normal position, and another device responsive to said key operation to block return of said carriage, whereby to actuate said line spacer and to restore said starter-means by said power-means without returning said carriage from an advanced position.

12. In a typewriting machine, in combination, an advanceable carriage returnable to a predetermined position, a line spacer on said carriage, movable relatively thereto, to effect a line spacing operation, said line spacer thereupon being movable along with said carriage in return direction, power means, a normally idle actuator adapted to act through said line spacer for effecting line spacing and return of said carriage, means including a part displaceable from a normal position to cause said power means to operate said actuator, an element operatable by the relative movement of said line spacer to said carriage, an element operatable by the return of said carriage to said predetermined position, and normally ineffectively conditioned means adapted when effectively conditioned to be actuated to restore said part to thereby terminate the power operation of said actuator, said last means when ineffectively conditioned, and also when effectively conditioned but not operated, allowing displacement of said part from normal position to cause a power operation of said actuator, and means to effectively condition and operate said conditionable means respectively by the operation of either one of said elements followed by the operation of the other one.

13. In a typewriting machine, in combination, a frame, a reciprocatory carriage on said frame, power means, an actuator for returning said carriage, means including a part on said frame displaceable from a normal position to an effective position to effect operation of said actuator by said power means, a shut-off control member on said carriage limitedly movable relatively thereto by said actuator, and a device operatively connected with said means that includes said part including two elements movable from ineffective to effective positions to supplement each other to restore said part to normal position, to thereby terminate the power operation of said actuator, means for effectively positioning one of said elements by the movement of said control member by said actuator and means for effectively positioning the other of said elements by the return of the carriage to, or the stationing of the carriage at a predetermined return position.

14. In a typing machine, in combination, a reciprocatory carriage, a line spacer on and limitedly movable relatively to said carriage to effect line spacing, power means, an actuator connected to said line spacer, for limitedly moving the latter relatively to the carriage and ensuingly returning said cariage to a predetermined position, means including a part displaceable from a normal position to effect a power operation of said actuator by said power means, means operatively associated with the means that includes said part, including two elements adapted to be moved to supplement each other to effect restoration of said part to normal position for terminating the power operation of said actuator, means to move one of said elements by the actuation of said line spacer, and means to move the other of said elements by the movement of the carriage to said predetermined position.

15. In a typing machine having a frame, a reciprocatory carriage thereon, and a line spacer on said carriage; normally ineffective power mechanism adapted to operate said line spacer and return said carriage to a predetermined position, means including a part displaceable on said frame from a normal position to cause said power mechanism to operate said line spacer and return said cariage, a carriage return stop on the carriage, a laterally movable carriage-return counter-stop, a motion limiting abutment on the frame for said counter-stop, said carriage stop being adapted to move said counterstop against said abutment during the return of the carriage to said predetermined position, a toggle linkage including a link operatively connected to said counter-stop and another link operatively connected to the said part; and an element on the said carriage movable by the operation of said line spacer and controlling the effective length of the toggle linkage so that the return of the carriage to said predetermined position as well as the movement of said element by the operation of said line spacer is required to restore said part to normal position for terminating said power operation.

16. In a typing machine having a frame, a carriage, a limitedly operable line spacer on the carriage and a carriage return gaging margin stop on the carriage, the combination of normally ineffective power means operatively conected to said line spacer to first line space and then return the carriage, means operable to effectuate said power means, a counterstop on the frame adapted to be moved by said margin stop during carriage return, a normally ineffectively conditioned connection between said operable means and said counter-stop adapted when effectively conditioned to transmit motion from said counterstop to said operable means to restore it and thereby ineffectuate said power means, a control member extending parallel to the carriage, means for causing said control member to be actuated concomitantly with said line spacer to effectively condition said connection so that said margin gaging stop is capable of moving said operable means to normal position via said connection through operation of said counterstop to ineffectuate said power means, and means to move said counterstop transversely of the carriage out of cooperative range with said margin stop, said normally ineffectively conditioned connection being constructed to give said counterstop capacity for transverse movement.

17. In a typing machine having a frame, a reciprocatory carriage thereon, a line spacer on the carriage, a carriage return gaging margin stop on the carriage, and a counter-stop on the frame for said margin stop, said counter-stop being movable laterally, the combination of power means, an actuator for returning said carriage and actuating said line spacer, means including a part on said frame displaceable from a normal position to cause an operation of said actuator by said power means, a power shut off control element on said carriage, means for causing paid control element to be actuated concomitantly with said line spacer, and a device having operative connections with said displaceable part, said counter-stop and said control element, and having provision for restoring said part to normal position after said displacement, in response to an actuation of said control element and an impartation of a movement to said counter-stop by said cariage-return-gaging margin stop, to thereby shut off the power operation of said actuator.

18. In a typing machine having a frame, a reciprocatory carriage thereon, a line spacer on the carriage, a carriage return gaging margin stop on the carriage, and a counter-stop element on the frame for said margin stop, said counter-stop element being limitedly actuatable by the margin stop by the return of the carriage, the combination of power-means, an actuator for returning said carriage and effecting an operation of said line spacer, means including a part on said frame displaceable from a normal position to effect operation of said actuator by said power-means, a power shut off control element on said carriage, means for causing said control element to be actuated concommitantly with said line spacer, and normally ineffectively conditioned connecting means between said elements and said displaceable part, adapted when effectively conditioned to transmit motion from either one of said elements to said displaceable part for restoring it, means to effectively condition said connecting means by the actuation of either one of said elements, whereby said displaceable part is restorable, (1) by the actuation of said control element on the carriage, if the carriage is in returned position with the margin stop against said counter-stop element, or (2) by the impartation of a movement to said counter-stop element by the carriage return gaging margin stop during a return of the carriage if the said control element on the carrage is actuated by the said actuator before the carriage reaches the returned position as determined by said return gaging margin stop.

19. In a typing machine having a frame, a reciprocatory carriage thereon, a line spacer on the carriage, a carriage return gaging margin stop on the carriage, and a counter-stop element on the frame for said margin stop, said counter-stop element being limitedly actuatable by the margin stop by the return of the carriage, the combination of power-means, an actuator for returning said carriage and effecting an operation of said line spacer, means including a part on said frame displaceable from a normal position to effect operation of said actuator by said power-means, a power shut off control element on said carriage, means for causing said control element to be actuated concomitantly with said line spacer normally ineffectively conditioned connecting means between said elements and said displaceable part, adapted when effectively conditioned to transmit motion from either one of said elements to said displaceable part for restoring it, means to effectively condition said connecting means by the actuation of either one of said elements, whereby said displaceable part is restorable, (1) by the actuation of said control element on the carriage, if the carriage is in returned position with the margin stop against said counter-stop element, or (2) by the impartation of a movement to said counter-stop element by the carriage return gaging margin stop during a return of the carriage if the said control element on the carriage is actuated by the said actuator before the carriage reaches the returned position as determined by said return gaging margin stop, a line space key, means operable by said line space key to cause displacement of said part from normal position, and means also operable by said line space key to condition said connecting means for restoration of said part by the actuation of only the said control element on the carriage.

20. In combination, a frame, a reciprocatory typing carriage thereon, power means, an actuator for returning said carriage, means including a part on said frame displaceable from a normal position to effect operation of said actuator by said power means, means operatively connected to said part conditionable for operation to restore said part, a carriage projection adapted by the movement of said carriage to return position to operate said conditionable means, wherefore, if said last means is conditioned, movement of the carriage to returned position will restore said part and will consequently terminate the power operation, a controller, means for actuating said controller during the return of the carriage, said controller presenting an edge parallel to the carriage in operative association with said conditionable means for conditioning the latter in response to the actuation of said controller whereby to enable said projection to restore said part only if said controller is actuated.

21. The combination with a carriage that is advanceable from and returnable to a predetermined position, a normally ineffective power mechanism adapted to return said carriage to the said predetermined position and starter-means displaceable from a normal to an operated position to render said power mechanism effective to return said carriage and restorable to normal position to render said power mechanism ineffective, of power shut-off mechanism including a movable carriage-return-limiting counter-stop, said carriage in being moved to the said predetermined position being adapted to move said counter-stop, a collapsible toggle having operative connections with said starter-means and said counter-stop but being normally incapable of transmitting motion from said counter-stop to said starter means, and a bar extending parallel to the carriage operatively associated with said toggle and limitedly movable transversely of the direction of carriage travel by the said power mechanism to control the length of said toggle so that said starter-means is restorable by said counter-stop, the length of the toggle being so controlled by said bar that restoration of said starter-means in response to an operation of the counter-stop is dependent on the movement of said bar by said power mechanism.

22. In a typewriting machine, a frame, a reciprocatory carriage movable to and from a predetermined return position, an operable device on the carriage, power-means adapted to operate said device and ensuingly move said carriage to said predetermined position, control means movable from and to a shut-off position to respectively effectuate and ineffectuate said power-means, and automatically operative means to move said control means to shut-off position, including, two movable elements and means to transmit supplemental movements from said elements to move said control means to shut-off position, supplemental movements from both said elements being required to cause said motion-transmitting means to move said control means to shut-off position to ineffectuate said power means, one of said elements comprising a limitedly movable member operable by said device in being power operated to give one of said supplementary movements, and means to move the other one of said elements to give the other of said supplementary movements in response to a return of the carriage to said predetermined position.

WILLIAM F. HELMOND.